United States Patent [19]
Rodriguez

[11] Patent Number: 5,679,731
[45] Date of Patent: Oct. 21, 1997

[54] CEMENT SLURRY

[75] Inventor: Wilfredo Rodriguez, Los Teques, Venezuela

[73] Assignee: Intevep, S.A., Caracas, Venezuela

[21] Appl. No.: 532,003

[22] Filed: Sep. 21, 1995

Related U.S. Application Data

[63] Continuation of Ser. No. 298,855, Aug. 31, 1994, abandoned.

[51] Int. Cl.$^6$ ............................. C08L 1/02; C08L 31/04
[52] U.S. Cl. ...................... 524/5; 524/486; 524/524; 524/563; 524/588; 523/130
[58] Field of Search .......................... 524/5, 486, 524, 524/563, 588; 523/130

[56] References Cited

U.S. PATENT DOCUMENTS

| | | | |
|---|---|---|---|
| 3,058,520 | 10/1962 | Woodard et al. | 524/459 |
| 3,668,165 | 6/1972 | Bergmeister et al. | 166/293 |
| 4,434,257 | 2/1984 | Narisawa et al. | 524/5 |
| 4,528,238 | 7/1985 | Alford | 428/246 |
| 4,537,918 | 8/1985 | Parcevaux et al. | 523/130 |
| 4,767,460 | 8/1988 | Parcevaux et al. | 106/90 |
| 5,099,922 | 3/1992 | Ganguli | 166/293 |

*Primary Examiner*—Joseph L. Schofer
*Assistant Examiner*—John J. Guarriello
*Attorney, Agent, or Firm*—Bachman & LaPointe, P.C.

[57] ABSTRACT

A low density, antimigratory cement composition includes cement, water and between about 0.5 to about 2.5 gallons per sack of cement of an additive wherein the additive is a copolymer of an impermeability agent and a gelling agent wherein said impermeability agent is a vinyl acetate-containing material and wherein said gelling agent is a vinyl ester which is compatible with said impermeability agent, whereby said cement composition in slurry form is thixotropic and resistant to gas migration.

13 Claims, 3 Drawing Sheets

CEMENT SLURRY

This is a continuation of application Ser. No. 08/298,855 filed on Aug. 31, 1994 now abandoned.

BACKGROUND OF THE INVENTION

The invention relates to a cement composition for use in completing oil wells and, particularly, to a low density cement slurry which is highly impermeable or antimigratory to gas.

Cementing is a common and well known technique for completing wells. During this step, cement is placed, i.e. by pumping, between a well casing and the well bore or formation. When the well traverses a gas formation, however, problems are encountered due to channeling or gas flow from the formation and through the cement slurry which leads to weakened and ineffective cement jobs.

A number of criteria have been developed which serve as indicators of a suitable cement composition and of the antimigratory or gas migration control properties of the cement composition. These criteria include fluid loss control, thickening time, transit time, gel strength, compression strength, impermeability and rheology.

Fluid loss control relates to the ability of the cement slurry to keep slurry water in solution and prevent undesirable water loss into the formation. API tests exist for the evaluation of fluid loss control. A water loss of less than about 100 cc per 30 minutes is considered good.

A good fluid loss control also helps to provide improved gas control by providing an effective completed cement job. A cement slurry which loses water into the surrounding permeable formations leads to a final cement job having granular porous cement adjacent to the formation. Such granular porous sections are not effective in containing gas and large amounts of gas migration and a structural weakening of the cemented well are the result.

Thickening time relates to the time it takes for the slurry to solidify to the point where pumping is no longer practical. The thickening time should generally be about 1 hour longer than the estimated operation time for the cement to be pumped into location between the well bore and well casing.

Another parameter is the transit time for the slurry under static conditions to develop a gel strength of about 500 pounds per 100 ft$^2$. This time is preferably as short as possible and is an indicator of suitable rheological properties, as well as good gas control properties.

Compression strength is the strength in compression of the thickened or partially dried cement composition. It is desirable that the cement composition develop a compression strength of at least about 500 psi within a 24 hour period.

Impermeability relates to the ability of the composition in slurry form to resist or control gas migration. The composition suitably exhibits a gas permeability of less than or equal to about 0.1 md.

The problem of gas channeling is a long standing one in the industry. It is particularly problematic to provide a low density cement slurry which meets the desired criteria. Numerous attempts have been made to address the problem. For example, U.S. Pat. Nos. 4,537,918, 4,721,160 and 4,767,460, all to Parcevaux et al., disclose the addition of a styrene-butadiene latex (SBR) additive which, when used in the proper proportions and with additional additives, is intended to provide a slurry having low density and suitable reduction in gas channeling or migration.

The foregoing patents, however, all call for the use of additional additives and agents with the SBR latex which are required for example to prevent the rapid formation of flocs of latex which interfere with pumping and limit the effectiveness of the cement at preventing gas migration. Further, SBR latex may be unstable at high temperatures which may be encountered.

The need exists for a cement composition which suitably addresses each of the foregoing concerns.

It is therefore the primary object of the invention to provide a low density cement composition which possesses good gas migration control without the need for latex and numerous additional agents.

It is a further object of the invention to provide a cement composition which has a low density and a good thickening time, gel strength and transit time, compression strength, little or no water loss, and good rheological properties.

Other objects and advantages will appear hereinbelow.

SUMMARY OF THE INVENTION

The foregoing objects and advantages are readily obtained by the present invention.

In accordance therewith, a cement composition is disclosed which comprises cement, water and between about 0.5 to about 2.5 gallons per sack of cement of an additive comprising a copolymer of an impermeability agent and a gelling agent wherein said impermeability agent is a vinyl acetate-containing material and wherein said gelling agent is a vinyl ester which is compatible with said impermeability agent, whereby said cement composition in slurry form is thixotropic and resistant to gas migration.

BRIEF DESCRIPTION OF THE DRAWINGS

A detailed description of the preferred embodiments of the invention follows, with reference to the accompanying drawings, wherein.

DETAILED DESCRIPTION

Figure 1:
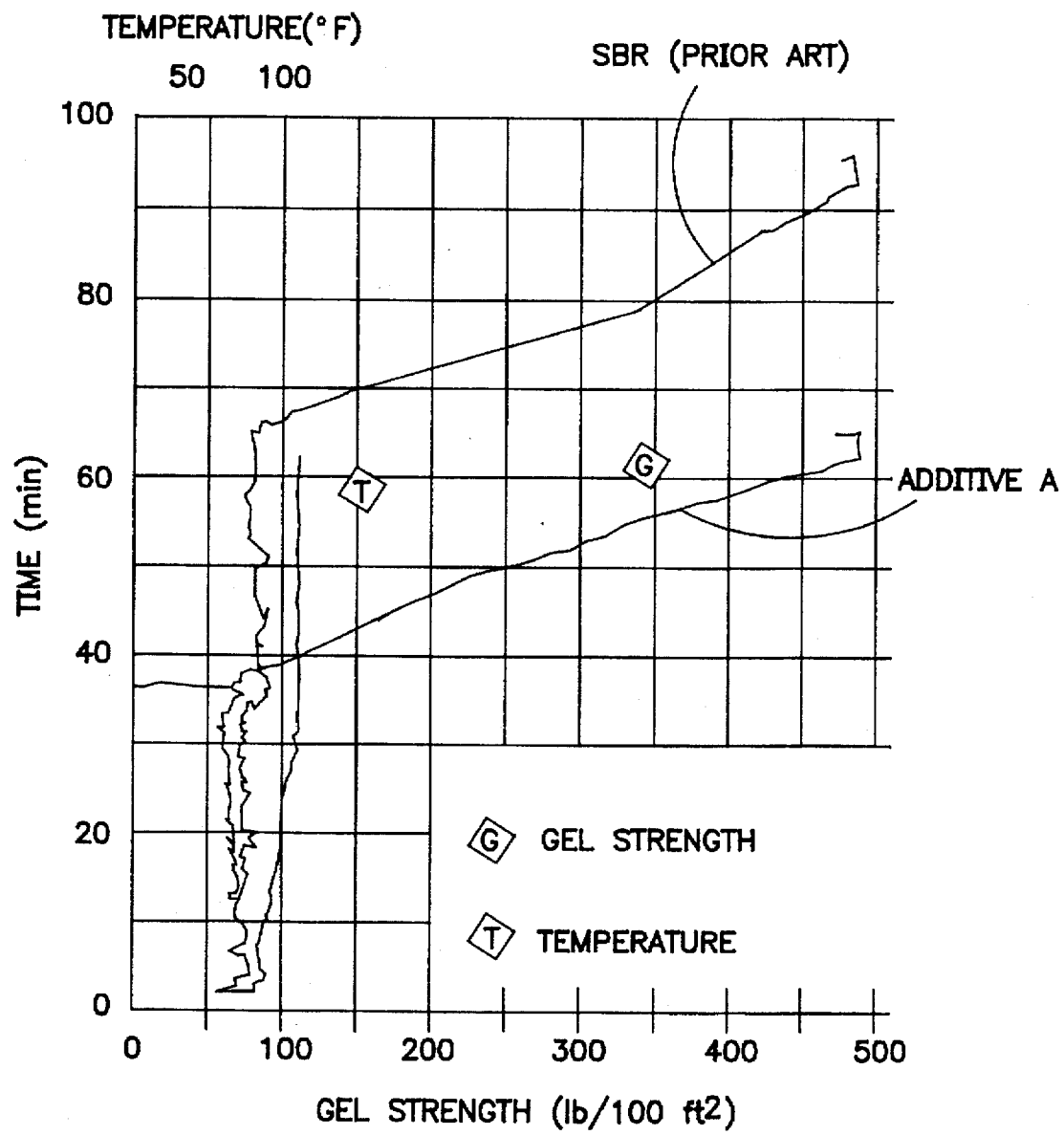
FIG. 1 illustrates the development of gel strength over time of a cement composition including an additive according to the invention (Additive A) and of a prior art SBR composition.

The invention relates to a low density cement composition for use in cementing oil wells which cement composition exhibits excellent theological properties and, in accordance with the invention, also provides enhanced control of gas migration.

In accordance with the invention, the cement composition comprises cement, water, and an additive which contributes to the gas control and thixotropic or gelling properties of the composition.

The cement may be any type of cement known in the art. Examples of typical cement include Class A and Class H cement (as designated by the American Petroleum Institute), which are hydraulic cements (i.e., activated by water), and which can typically be mixed in suitable cement/water ratios to provide slurries having the desired low densities. The amount of water to be used depends upon the selected type of cement and the desired density of the cement. For example, Class H cement typically uses water at about 38% by weight of the cement and yields a cement composition having a density of about 16.4 pounds/gallon. Class A cement typically uses about 45% water by weight of cement, and yields a cement composition having a density of about 15.5 pounds/gallon. Of course, other types of cement may be used if desired.

The water may be any available fresh or salt water and may be used without further treatment or addition of chemicals.

The additive, in accordance with the invention, is a copolymer of an impermeability or gas control agent and a compatible gelling agent. The additive is preferably used in an amount of between about 0.5 to about 2.5 gallons per sack of cement.

The impermeability agent in accordance with the invention is preferably a vinyl acetate-containing material, or a material including vinyl acetate or the vinyl acetate moiety such as vinyl acetate, polyvinyl acetate, ethylene vinyl acetate, and other aliphatic vinyl acetate materials. Vinyl acetate, polyvinyl acetate, and ethylene vinyl acetate are preferred.

The gelling agent is preferably a polymer compatible with the selected impermeability agent, and is preferably vinyl ester obtained or derived from a carboxylic acid having alkyl chains, preferably long branched alkyl chains, and having between about 2 to about 20 carbon atoms, preferably about 6 to 8 carbon atoms. The alkyl chains may also suitably be long branched chains such as glycol, ethylene oxide groups, amine groups, and mixtures thereof.

The aforedescribed gelling agents are particularly useful because they provide the additive with a good resistance to shear stress and also to the high pH and calcium of the cement slurry which could adversely affect other types of additives.

The additive in accordance with the invention preferably includes impermeability agent and gelling agent in a suitable ratio to provide the desired copolymer. The molar ratio of impermeability agent to gelling agent is preferably between about 1:1 to about 1:2.

In accordance with the foregoing, the cement composition possesses excellent gas control properties, as set forth in the appended examples. The cement composition in slurry form also possesses excellent rheological properties and meets each of the foregoing criteria.

Further, the additive of the present invention helps to provide desirable transit time characteristics of the cement slurry containing the additive. In accordance with the invention, transition begins immediately and is completed more quickly than conventional SBR latex slurries in similar conditions. This is further illustrated in the Examples and in FIG. 1.

The cement composition may further include anti-foaming agents, retarders, and/or extenders if desired.

Anti-foaming agent may be added if necessary to prevent foaming. Best results are obtained by first mixing the anti-foaming agent and additive with the water and then adding the cement preferably in a manner that will provide a dispersion of the phases. The anti-foaming agent is preferably a mixture of naphthenic oil and silicon, but may be any material known to impart anti-foaming. The anti-foaming agent preferably includes between about 10% to about 70% by wt of agent of silicon and between about 90% to about 30% by wt of agent of naphthenic oil. The anti-foaming agent is preferably used in the cement composition in the range of between about 0.01 to about 0.05 gallons per sack of cement.

When particularly low density cement is desired, in accordance with the invention, additional water may be added to provide the desired reduced density. In accordance with the invention, the copolymer additive is preferably water receptive or absorptive up to about 30% by weight of the additive. This water absorptive quality of the additive advantageously allows slurry density to be reduced without the use of additional extender agents. Thus, cement composition according to the present invention may be adjusted to the desired low density without generally requiring traditional extender agents. This is preferable since extender agents tend to reduce the compression strength of the cement and also are an additional ingredient which of course represents additional cost.

If the density must be further reduced, extender agents such as silicate compounds, preferably sodium silicate or sodium metasilicate, may be added in amounts required to reach the desired density. Other conventional extenders or silicate compounds may also be utilized.

Retarders may also be used, if desired, to increase the thickening time of the cement slurry. This may be useful in situations where the operation time exceeds 2 hours and/or temperatures exceeding 150° F. are to be encountered. Any conventional retarder may be used. Those derived from methyl and/or ethyl groups, particularly methyl or ethyl cellulose compounds such as carboxymethyl cellulose and hydroxyethyl cellulose, and mixtures thereof are preferred.

In accordance with the invention, a cement composition is provided which includes an additive which serves to enhance the properties of the cement composition so as to provide a fluid loss of less than or equal to about 100 cc/30 min, a static gel strength of at least about 500 pounds/100 ft$^2$, a transit time of less than or equal to about 24 minutes, a compression strength of at least about 500 psi, and a gas permeability of less than or equal to about 0.1 md.

In accordance with the invention, the cement composition containing additive as set forth herein may be used to prevent gas channelling or migration in a well annular space by cementing the well annular space with the cement composition of the present invention.

The following Examples illustrate advantages and characteristics of the cement composition according to the invention.

EXAMPLE 1

A cement composition was prepared in accordance with the invention using Class H cement, 2 gallons per sack of additive (Additive A, FIG. 1) comprising copolymer of vinyl acetate and vinyl ester from carboxylic acid having alkyl chains of 8 carbon atoms at a molar ratio of vinyl acetate to vinyl ester of 1:2, and 0.01 gallons per sack of anti-foam agent (80% wt napthenic oil and 20% wt silicon).

A conventional cement composition was also prepared using Class H cement, 2 gallons per sack of SBR additive, 0.01 gallons per sack of an anti-foam agent made by Dow Chemical and identified as D-75, and 376 lb. of CaCl$_2$.

The cement compositions were tested to determine transit time of each cement composition. The test was carried out on a multiple analyzer cement slurry (MACS) apparatus from Halliburton, and measured the time necessary for the slurries to develop a gel resistance or strength of 500 pounds/100 ft$^2$. FIG. 1 illustrates the development of gel resistance of each slurry. The slurry according to the invention shows a transit time to gel resistance of only 24 minutes, with evolution beginning immediately upon initiating the test (shown on the drawing at about the 38 minute line). This compares favorably with the conventional slurry which had a transit time of about 34 minutes, with evolution beginning 28 minutes later than the slurry according to the invention.

Figure 2:
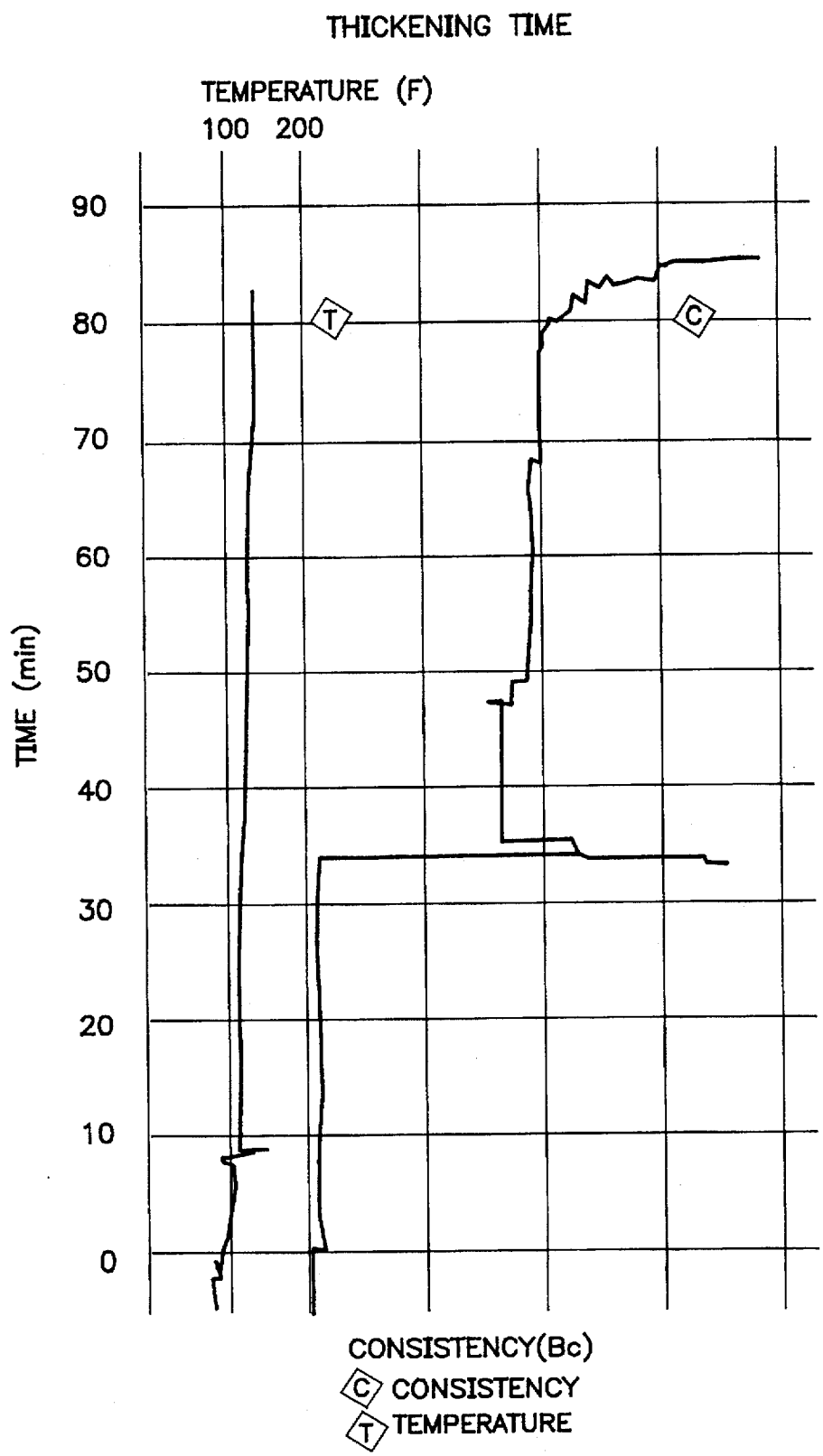
FIG. 2 illustrates the consistency over time of a composition according to the invention in Bearden units of consistency (Bc)

The cement composition according to the invention was also tested with a CHANTHOL Model consistometer from Chandler Engineering Company to evaluate rheologic behavior and thickening time. The test, illustrated in FIG. 2, shows that the cement composition has a suitable thickening time and consistency. As shown, consistency remained low as desired for a period of about 78 minutes, and then thickened at a suitable rate thereafter. Thus, the cement slurry of the present invention exhibits good rheological properties.

Figure 3:
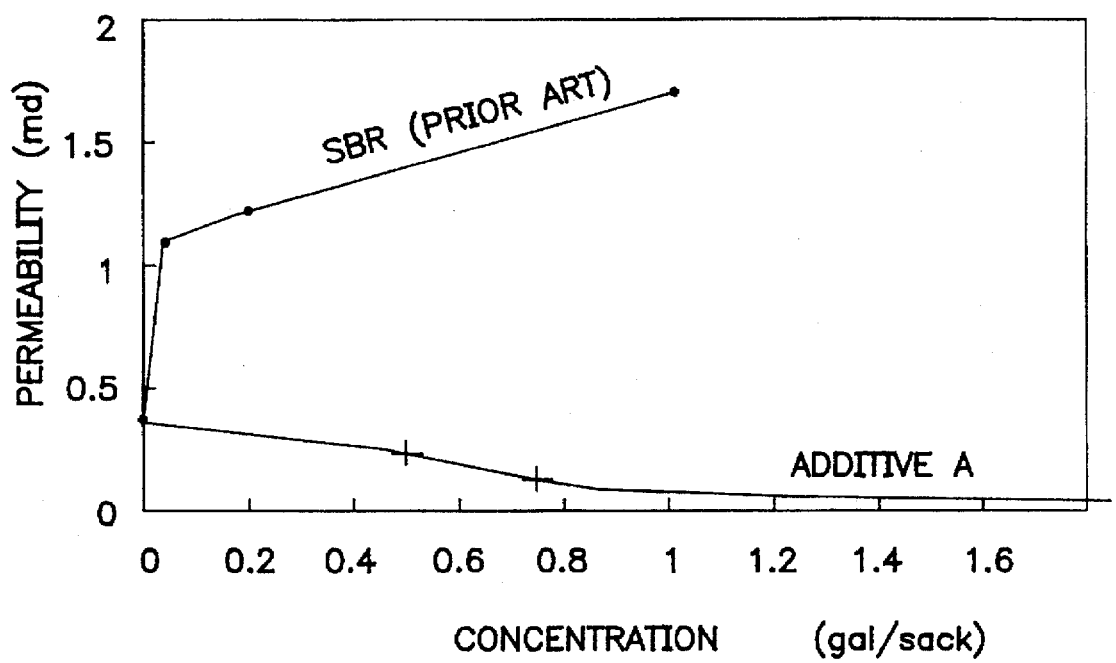
FIG. 3 illustrates the permeability of a cement composition including an additive according to the invention (Additive A) and of a prior art SBR composition.

The cement composition containing additive according to the present invention (Additive A, FIG. 3) was also tested and compared to the conventional SBR cement composition for gas permeability at 250° F., a typical static bottom hole temperature for deep or high temperature wells. The results are shown in FIG. 3.

As shown, cement containing additive according to the present invention has significantly improved permeability features as compared to the prior art SBR cement composition.

EXAMPLE 2

This example illustrates the characteristics of a cement slurry according to the invention. Testing was carried out on wells in the Bolivar Coast field of Maracaibo Lake. This field was selected due to the presence of gas deposits between 400 to 1500 feet. The cement for these wells needs to have a low density and a high degree of gas migration control. Bottom hole temperature was between about 90° to 120° F., and the estimated operation time was about 1 hour 20 minutes.

The cement used was as follows:
Cement Slurry Volume: 100 bbls
Cement: Class H, 330 sacks
Additive: Copolymer of vinyl acetate and a vinyl ester from carboxylic acid having alkyl chains of 8 carbon atoms at a molar ratio of vinyl acetate to vinyl ester of 1:2, 2 gals. per sack
Anti-foam agent: 80% wt. naphthenic oil and 20% wt. silicon, 0.01 gals. per sack
Water: 5.6 gals. per sack The properties exhibited by the cement at the test conditions are set forth in Table 1 below.

TABLE 1

| Density: | 14.5 lbs./gal. |
|---|---|
| Thickening time: | 2 hr. 30 min. |
| Comp. strength: | 1280 psi (after 24 hours) |
| Fluid loss: | 50 cc/30 min. |
| Free water: | 0% |

As shown, the cement composition according to the invention exhibits suitable density and thickening time, develops excellent compression strength over 24 hours, and has very little fluid loss with no free water.

EXAMPLE 3

This example was carried out under the same well conditions as Example 2.

The cement used was as follows:
Cement Slurry Volume: 100 bbls
Cement: Class H, 501 sacks
Additive: Copolymer of vinyl acetate and a vinyl ester from carboxylic acid having alkyl chains of 8 carbon atoms at a molar ratio of vinyl acetate to vinyl ester of 1:2, 2 gals. per sack
Anti-foam agent: 80% wt. naphthenic oil and 20% wt. silicon, 0.01 gals. per sack
Water: 2.78 gals. per sack The properties exhibited by the cement are set forth in Table 2 below.

TABLE 2

| Density: | 16.2 lbs./gal. |
|---|---|
| Thickening time: | 2 hrs. 15 min. |
| Comp. strength: | 2525 psi (after 24 hrs.) |
| Fluid loss: | 22 cc/30 min. |
| Free water: | 0% |

As with the cement of Example 2, this cement composition exhibits excellent properties.

EXAMPLE 4

Testing was carried out on a well in San Joaquin Field at Corpoven, in Anaco. The well had a depth of 9,660 feet, a bottom hole circulating temperature of 183° F. and a bottom hole static temperature of 250° F. Gas formations were present at 7,285 feet.

A cement composition was formulated according to the invention for a deep well at high temperatures as follows:
Cement Slurry Volume: 90 bbls
Cement: Class A, 300 sacks
Additive: Copolymer of vinyl acetate and vinyl ester from carboxylic acid having alkyl chains of 8 carbon atoms at a molar ratio of vinyl acetate to vinyl ester of 1:2, 1 gal. per sack
Extender: Sodium metasilicate: 0.13% wt of cement
Retarder: Carboxymethyl cellulose and hydroxyethyl cellulose in weight ratio of 1:1, 0.4% wt. of cement.
Anti-foam agent: 80% wt. naphthenic oil and 20% wt. silicon, 0.01 gals. per sack
Water: 7.95 gals. per sack The properties exhibited by this cement are set forth below in Table 3.

TABLE 3

| Density: | 13.5 lbs./gal. |
|---|---|
| Thickening time: | 4 hrs. 20 min. |
| Comp. strength: | 1100 psi (after 24 hrs.) |
| Fluid loss: | 100 cc/30 min. |
| Free water: | 0% |

As shown, a cement composition was provided according to the invention having a low density, a long thickening time, and suitable compression strength and fluid loss all as desired.

As demonstrated by the foregoing, the cement composition of the present invention has a significantly low density and still posseses the desired characteristics.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A low density cement composition, comprising cement, water and between about 0.5 to about 2.5 gallons per sack of cement of an additive comprising a copolymer of vinyl acetate and a vinyl ester of a carboxylic acid having alkyl chains of 3–20 carbon atoms, the molar ratio of said vinyl acetate to said vinyl ester of a carboxylic acid being between about 1:1 and 1:2 whereby said cement composition in slurry form is thixotropic and resistant to gas migration, said cement composition being characterized by the following properties:

density from about 13 to about 16.5 pounds/gallon;

fluid loss less than or equal to about 100 cc/30 min.;

static gel strength at least about 500 pounds/100 ft$^2$;

gas permeability in slurry form less than about 0.1 md.

2. A cement composition according to claim 1, wherein said vinyl ester is a vinyl ester of carboxylic acid having between 6 to 8 carbon atoms.

3. A cement composition according to claim 1, further comprising between about 0.01 to about 0.05 gallons per cement sack of an anti-foaming agent.

4. A cement composition according to claim 3, wherein said anti-foaming agent comprises a mixture of naphthenic oil and silicon.

5. A cement composition according to claim 4, wherein said anti-foaming agent comprises between about 10 to about 70% wt silicon and between about 90 to about 30% wt naphthenic oil.

6. A cement composition according to claim 1, further comprising a retarding agent for increasing thickening time of said cement composition.

7. A cement composition according to claim 6, wherein said retarding agent is selected from the group consisting of ethyl cellulose, methyl cellulose and mixtures thereof.

8. A cement composition according to claim 7, wherein said retarding agent is selected from the group consisting of carboxymethyl cellulose, hydroxyethyl cellulose, and mixtures thereof.

9. A cement composition according to claim 1, further comprising an extender agent for reducing density of the cement composition.

10. A cement composition according to claim 9, wherein said extender agent is a silicate compound.

11. A cement composition according to claim 1, wherein said additive has a water absorption capacity of about 30% by weight of the additive whereby density of the cement composition is reduceable by adding water.

12. A cement composition according to claim 1, wherein said composition exhibits a transit time of less than or equal to about 24 minutes.

13. A cement composition according to claim 1, wherein said composition has a strength in compression of at least about 500 psi.

* * * * *